Sept. 18, 1962   E. G. ROGGENBURK   3,054,389
AIR DRIVEN ROTARY MOTOR

Filed March 2, 1959   3 Sheets-Sheet 1

INVENTOR.
EARL G. ROGGENBURK

BY

*Eber J. Hyde*

ATTORNEY

*INVENTOR.*
EARL G. ROGGENBURK

BY

ATTORNEY

United States Patent Office 3,054,389
Patented Sept. 18, 1962

3,054,389
AIR DRIVEN ROTARY MOTOR
Earl G. Roggenburk, 4120 Behrwald Ave.,
Cleveland 9, Ohio
Filed Mar. 2, 1959, Ser. No. 796,691
11 Claims. (Cl. 121—84)

This invention pertains to an air driven rotary motor such as is used for a pneumatic grinder or the like, and more particularly it pertains to a more efficient and more easily controlled motor for a tool.

In the past attempts have been made to provide a rotary grinder of the vane type wherein the vanes were made of a lubricating material, but such attempts all ended in failure of the graphite material to stand up to the mechanical beating involved, resulting in the necessity of providing lubrication for the air motor.

The present invention involves a rotor design for a high speed air driven tool wherein the rotor vanes are made of a lubricating material such as graphite, the graphite lubricating the parts of the motor so that extra lubrication is not required, and to have parts of the motor protect the graphite vanes so that they can withstand the mechanical stresses and impacts involved.

Another aspect of the invention resides in the provision of a new and novel mechanism for automatically controlling the speed of the motor, and which, in the event the governor fails, fails safe and shuts down the motor.

In the past speed control mechanisms for grinders and the like were not completely satisfactory. The nature of the use to which air driven motors are applied makes it highly desirable that a very fast-acting, positive control mechanism be provided. This is particularly true for grinders wherein the operator pushes the grinding wheel tightly against the body being ground, thereby tending to slow the tool, and the operator removes the tool permitting it to run at very high speed unless a governor is provided.

An object of the present invention is to provide an inherently self-lubricating air motor.

A further object of the invention is to provide an air motor structure which permits the use of relatively soft, self-lubricating materials such as graphite or the like as the driving vanes.

Another object of the invention is to provide a positive, quick acting centrifugal valve structure for an air driven rotary tool so that the air supply to the tool can be very positively and quickly metered into the tool as the operator applies a load to the tool and removes the load.

For a better understanding of the present invention, together with other and further objects thereof, reference is had to the following description taken in connection with the accompanying drawings, and its scope will be pointed out in the appended claims.

With reference to the drawings there is shown in FIGURE 1 a cross-sectional view of a pneumatic grinder embodying the invention.

Figure 1:
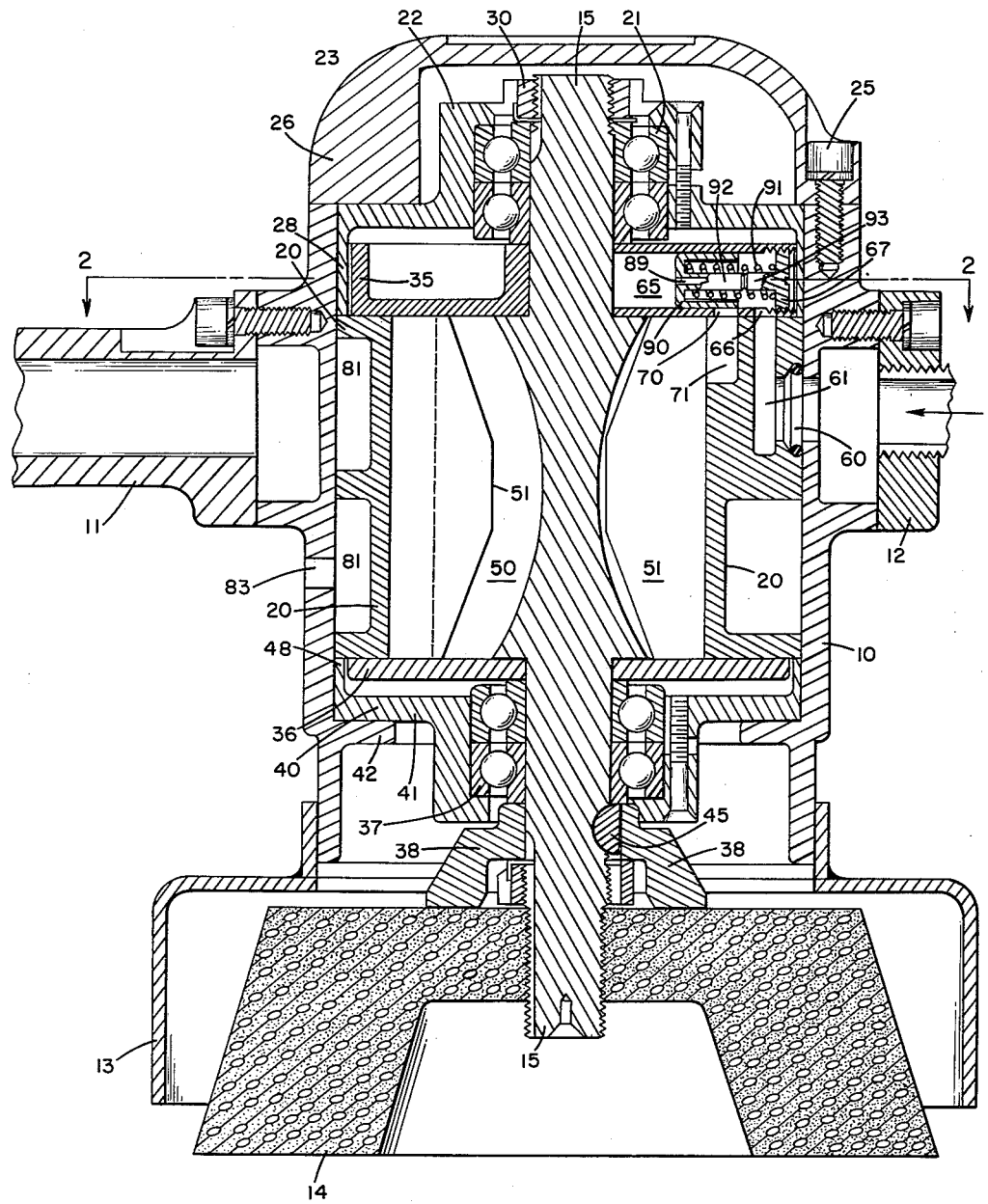
Figure 2:
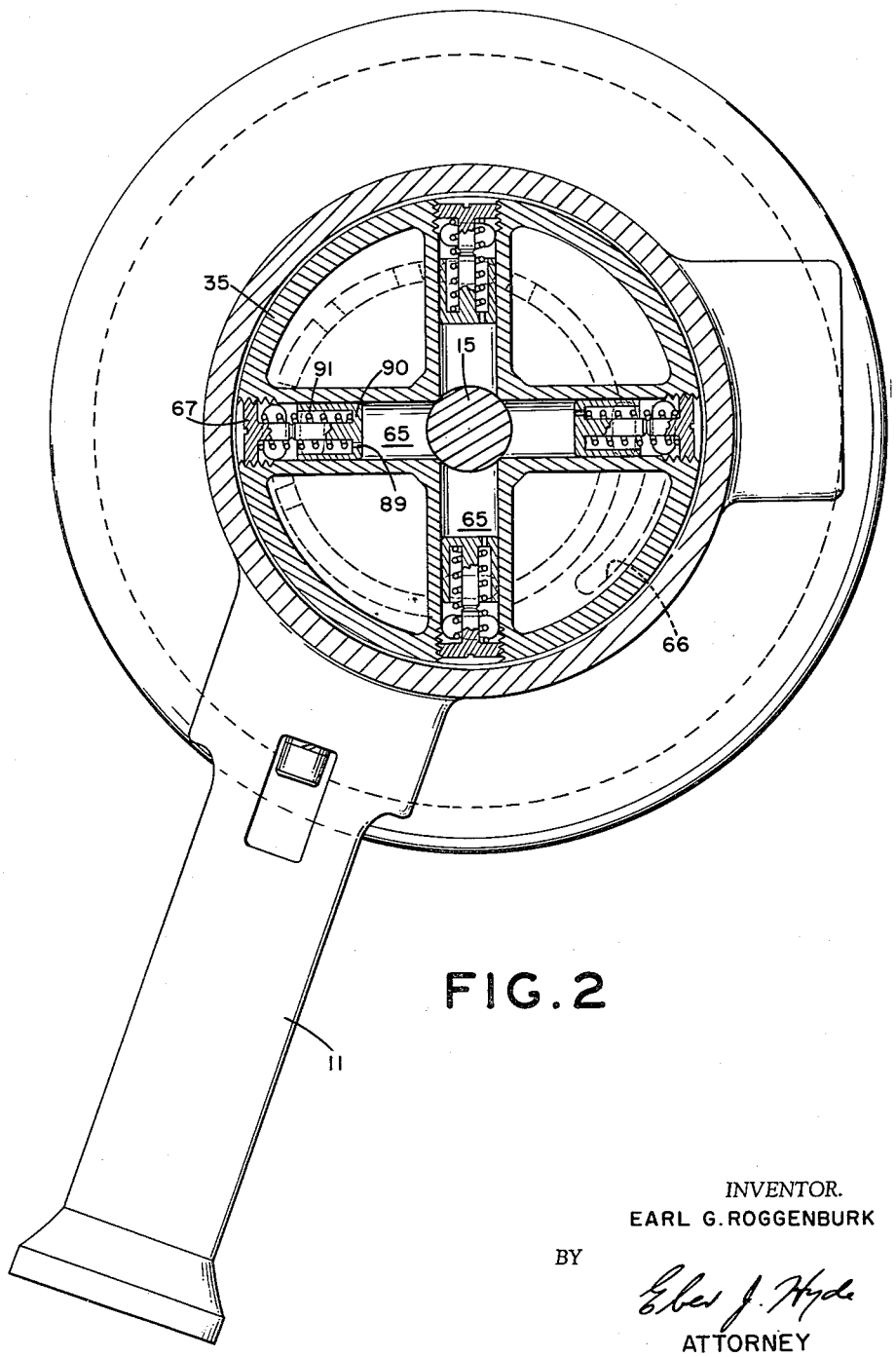
FIGURE 2 is a sectional view taken along line 2—2 of FIGURE 1, particularly showing the centrifugal valves of the tool.
Figure 3:
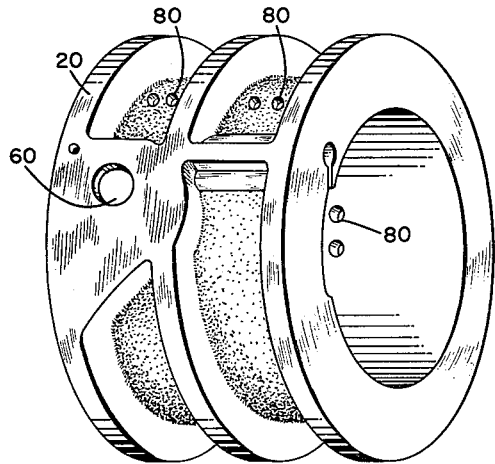
FIGURE 3 is an isometric view of one end of the eccentric liner of the tool, showing some of the control ports.

As shown, the tool comprises a housing indicated by reference character 10, to which are connected two handles 11 and 12, handle 12 being hollow to admit air to the tool and embodying an on-off valve which the operator can turn to control the start-stop operation of the tool.

The housing 10 has a shield member 13 connected to it for shielding the grinding disk 14 which is mounted on drive shaft 15 extending back into the housing 10.

An eccentric liner 20 is mounted within the housing 10, and a drive shaft 15 extends through the housing and is mounted at its rearward end in the bearing 21, the outside race of which is held by the flange 22 positioned in the housing 10 by the back portion 23 of the housing. The back portion of the housing is bolted to the housing proper 10 by means of a plurality of bolts 25 spaced around its periphery, and the back portion 23 has a shoulder 26 which abuts against the central portion 27 of the flange 22, thereby holding an annular portion 28 of the flange 22 firmly against the end of the eccentric liner 20.

The rearward end of the drive shaft 15 is threaded and a threaded nut 30 is mounted a sufficient distance thereon so that it firmly engages the rearward end of the inner race of the ball bearings 21. The forward end of the inner race of the bearings 21 is positioned against an end plate 35 which is firmly mounted on the shaft 15 for rotation therewith. The end plate 35 extends radially away from the shaft 15 into overlapping engagement with the rearward end of the eccentric liner 20, a running clearance being provided between the liner 20 which is stationary and the end plate 35, since the end plate 35 rotates with the shaft 15 whereas the eccentric liner 20 is stationary. A forward end plate 36 is mounted on shaft 15 and rotates with it and abuts against the forward end of the eccentric liner 20, a running clearance being provided where they overlap, as at the rearward end.

Forward bearings 37 are mounted around drive shaft 15 and are positioned against the forward end plate 36, being held there by the end cap 38 and by the forward flange 40 whose central portion 41 is mounted against an annular inward extension 42 of the housing 10.

The grinder 14 is screwed onto the end of the shaft 15 and a key 45 locks the cap 38 to the shaft so that the shaft 15, the cap 38 and the grinder 14 rotate as a unit.

The flange 40 has an annular rearwardly extending portion 48 which lies radially outwardly over the end of the forward end plate 36 and against the eccentric liner 20. Thus the rearward end cap 23, when bolted to housing 10, holds the liner 20, the end plates 34, 36, the bearings 21, 37 and the flanges 27, 40 together, the housing extension 42 serving as a forward stop to limit the inward position of the assembly.

Secured to the shaft 15 at a location inside the eccentric liner 20 is a rotor 50 having a plurality of slots, as is known in the art. Within each slot there is loosely mounted a vane 51 which slides in and out of the slot as the rotor and shaft 15 rotate, the outside edge of each vane always being in sealing contact with the internal diameter of the eccentric liner 20.

Figure 4:
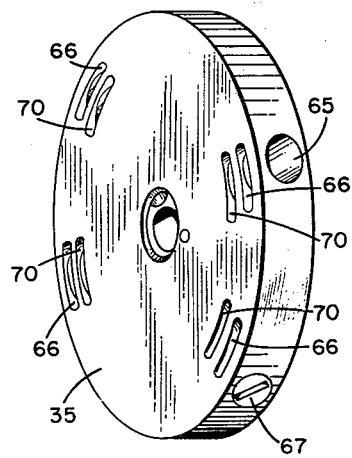
FIGURE 4 is an isometric view of the governor end plate of the tool showing other control ports.
Figure 5:
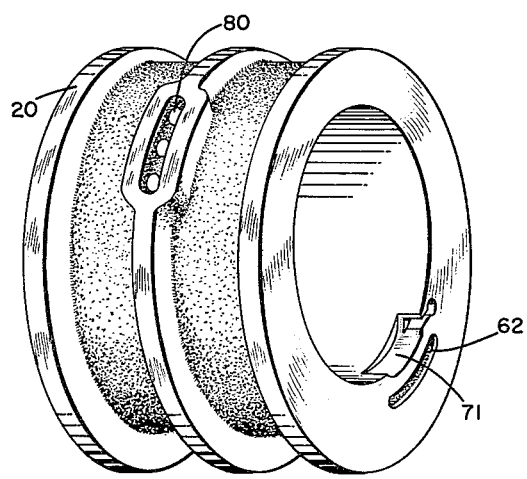
FIGURE 5 is an isometric view of the eccentric liner which fits against the rotating end plate shown in FIGURE 4.

Air is admitted to the tool through the hollow handle 12, and through port 60 to an axially extending bore 61 which opens into a circumferentially extending air inlet slot 62. The end plate 35, which is mounted adjacent the eccentric liner 20, has four radially extending bores 65, two of which are shown in FIGURE 1. Four outer slots 66 in the inner face of the rotating end plate 35 periodically rotate past the single slot 62 in the eccentric liner, thereby periodically admitting air to each of the four bores 65 in the end plate 35. The inner end of each bore 65 is sealed by drive shaft 15, and the outer end of each bore 65 is sealed by means of an end plug 67 held in place by a snap ring 68. In FIGURE 4, for the sake of clarity one end plug 67 is shown held in place by snap ring 68, and immediately above it is shown one of the radial bores 65. It is to be understood that in operation, all four of the radial bores 65 are sealed shut at their outer ends. Spaced radially inwardly of the four outer slots 66 are four inner slots 70 which, as the end plate 35 rotates with respect to the eccentric housing, periodically register with a circumferentially extending air inlet slot 71 in the eccentric liner 20. Thus as the end plate 35 rotates each of the four radially outwardly positioned slots 66 periodically registers for about 50 degrees with air inlet slots 61, thereby admitting air, under pressure, in turn, to the bores 65, and thence out through the radially inwardly positioned slots 70 to the air inlet slot 71 and into the interior of the tool where the expanding air rotates the vaned rotor 50, the drive shaft 15, the end plate 35, and the forward end plate 36, with respect to the stationary eccentric housing 20 and the stationary flange 22 and the stationary flange 40. The vanes 51, of course, rotate with the rotor 50, and since the end plates 35 and 36 also rotate there is no wear on the ends of the vane members tending to tilt them in their slots. Because there is no end wear and tilting of the vanes they can be made out of graphite and can withstand the accelerations and impacts to which they are subjected. The slight wear on the outer edge of the graphite vanes where they engage the inner face of the eccentric liner serves to lubricate the entire motor, and since there is no tilt or eccentric wear the vanes will have a long life. It is also to be noticed that due to the end plates 35, 36 rotating with the rotor 50, the forward and rear ball bearings 37, 21 are sealed from the air which is admitted to the tool, and that consequently none of the moisture which is present in the compressed air comes in contact with the bearings thereby greatly increasing the life thereof.

After the air within the rotor has expended its energy in turning the rotor it is exhausted out through holes 80 into channels 81 which extend part way around the outer circumference of the eccentric liner, and thence to atmosphere at any convenient location, such as the port 83 through the housing.

The governing action for the tool is achieved by slidably mounting a spring biased valve weight 90 in each of the four radial bores 65 in the rotating end plate 35. Each valve weight 90 is cup-shaped, and has a centrally located stem 92 extending from the bottom of the cup up to the region of the lip of the cup. The stem 92 has a bore 89 extending completely through it and through the bottom of the cup to prevent air pressure from building up on either side of the valve as the valve slides in and out in the bore 65. In the outer end of each bore 65 is the plug 67, and as shown in FIGURE 1 the plug may be screwed a short distance into the bore 65. A stem 93 on the plug 67 projects inwardly toward, and registers with, the stem 92 in the cup 90, thereby providing a positive stop to prevent the cup shaped valve weight 90 from moving too far outwardly in the bore 65. A spring 91 is positioned around the stems 92, 93 and is located between plug 67 and the valve weight 90, biasing the valve weight away from the plug to a position such that, when the tool is not operating at high speed, uncovers the opening 70 into the interior of the eccentric liner 20, permitting air under pressure to enter. However, when the tool is operating at high speed centrifugal force acting on the valve weight 90 compresses spring 91 causing the valve weight to partially, or almost completely, close the opening 70, thereby greatly reducing the supply of air to the tool and cutting down the tool speed. Upon application of a load to the grinder the motor speed is reduced, the cup shaped valve weight 90 uncovers the opening 70 and permits more air to flow to the interior of the tool. The position of the plug 67 is adjustable in the bore 65 thereby to provide an adjustment for regulating the operation of the tool. For any given air pressure and tool work load a balance will quickly be established by the tool so that the tool will run at a constant speed and deliver a constant work output. When the operator lifts the tool from the work thereby almost instantly reducing the work load to almost zero the instantaneous increase in speed throttles down the openings 70 and prevents a run-away tool. When the tool is put back to work and slows down, air pressure and the springs 91 force the weights radially inwardly to open up the ports 70 and admit more air to the rotor.

Adjustment of the speed of a tool may be effected by having the head of member 93 adjustable threaded into the wall of bore 65, which adjustment may be made when the tool is assembled, or the sealing end caps may be removed for adjustment.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. An air driven rotary motor comprising, in combination: a housing; a rotor with vane slots therein eccentrically mounted for rotation within said housing; two end plate means mounted one at each end of said rotor for rotation with said rotor and sealing said rotor within said housing; vane means made of compressed graphite mounted within said vane slots having two axially spaced apart edges in sealing engagement, respectively, with said two end plates, and having an axially extending edge in sealing engagement with said housing; said two end plates extending radially outwardly beyond the sealing edge of said vane means into sealing engagement with said housing whereby said axially spaced apart edges of said vane means rest solely against said rotatable end plates; one of said end plate means having a radially extending bore; air inlet means to said housing being through said bore and including port means into said housing; a centrifugally operated valve weight slidably mounted in said bore; bias means biasing said valve weight toward the axis of said rotor and away from said port means whereby centrifugal force due to high rotary motor speed overcomes said bias means and causes said valve weight to restrict the flow of air through said bore and into said housing; and air exhaust means extending from the inside of said housing to the outside thereof.

2. An air driven motor as set forth in claim 1, further characterized by said bias means comprising a spring.

3. An air driven motor as set forth in claim 2, further characterized by there being a plurality of said radially extending bores in said end plate each having a port into said housing, and each having a centrifugally operated valve weight slidably mounted therein and bias means for biasing said valve weight toward the axis of said rotor.

4. An air driven rotary motor comprising, in combination, a housing, a rotor with vane slots therein eccentrically mounted for rotation within said housing, a pair of end plates one at each end of said rotor sealing said rotor within said housing and mounted for rotation with said rotor, vane means mounted within said vane slots, at least one of said end plates having an air inlet port to the interior of said housing, and centrifugally operated governor weight valve means mounted in said end plate and operating in conjunction with said inlet port for controlling the flow of air through said port in accordance with the rate of rotation of said motor.

5. The device as set forth in claim 4, further characterized by a bore in at least one of said end plates extending perpendicular to the axis of rotation of said rotor, said governor weight means being slidably mounted within said bore for rotation with said end plate, spring means biasing said governor weight means against the centrifugal force which acts thereon, and valve means operated by said governor weight means as it moves under the centrifugal and spring forces for controlling the admittance of air to said motor.

6. The device as set forth in claim 5, further characterized by said rotating end plate having a plurality of said bores therein distributed in a balanced manner about said axis of rotation, and said device having said governor weight means and said spring means in each of said bores.

7. A device as set forth in claim 6, further characterized by said spring means biasing said governor weight means inwardly against the centrifugal force, and the said valve means being so positioned that movement of said governor weight means due to centrifugal force tends to close said valve means whereby failure of said spring causes said motor to throttle down.

8. An air driven rotary motor, comprising in combination, a rotor having a plurality of axial slots therein, a stationary eccentric housing around said rotor, a plurality of vanes one mounted in each of said axial slots and having an outer edge in engagement with said eccentric housing, a pair of end plates one at each end of said rotor connected for rotation with said rotor and with said vanes and extending radially outwardly into spaced but virtually air-sealing engagement with said eccentric housing, means for exhausting air from the inside of said virtually sealed housing, air inlet port means in at least one of said end plates for admitting air to the interior of said virtually sealed housing, and centrifugally operated valve means mounted in said end plate for controlling the flow of air through said air inlet port means in accordance with the rate of rotation of said rotor and end plates.

9. An air driven rotary motor as set forth in claim 8, further characterized by said vanes being made of compressed graphite.

10. An air driven motor as set forth in claim 8, further characterized by said at least one end plate having a bore extending perpendicular to the axis of rotation of said rotor, said centrifugally operated valve means being mounted within said bore.

11. An air driven motor as set forth in claim 10, further characterized by spring means mounted in said bore between said centrifugally operated valve means and the outside edge of said end plate whereby centrifugal force as said end plate rotates causes said valve means to compress said spring means and increased centrifugal forces cause said valve means to reduce the flow of air into said housing.

References Cited in the file of this patent

UNITED STATES PATENTS

| | | |
|---|---|---|
| 494,461 | Cathcart | Mar. 28, 1893 |
| 538,514 | Haeseler | Apr. 30, 1895 |
| 802,920 | Egersdorfer | Oct. 24, 1905 |
| 2,616,615 | Scott | Nov. 4, 1952 |

FOREIGN PATENTS

| | | |
|---|---|---|
| 122,069 | Australia | Sept. 20, 1946 |